UNITED STATES PATENT OFFICE.

RUSSELL S. PENNIMAN, OF DOVER, NEW JERSEY.

TRANSPARENT PHOTOGRAPHIC FILM.

SPECIFICATION forming part of Letters Patent No. 550,288, dated November 26, 1895.

Application filed March 11, 1886. Serial No. 194,884. (No model.)

*To all whom it may concern:*

Be it known that I, RUSSELL S. PENNIMAN, of Dover, in the county of Morris and State of New Jersey, have invented a certain new and useful Improvement in Flexible Photographic Dry-Plates or Films, of which the following is a specification.

Heretofore in this art much attention has been given to the production of flexible dry-plates or films, with a view to obtaining results equal to those obtainable by the use of glass, without the well-known disadvantages and objections incident thereto. As instances of materials embodied in flexible plates heretofore produced, I will mention mica, gelatin, and specially-treated paper, each of which, while meeting more or less of the well-known requirements, is more or less deficient in others. One object of my invention is to provide a flexible and practically indestructible plate or film which can be stored, handled, used, and carried either in the form of separate plates, as is preferable by me, or in continuous lengths. I also seek to obviate the destructive effects upon the plate itself incident to bending and rolling, specially noticeable with mica; also the cloudy effects liable to be present in gelatin plates incident to the use of means for enabling them to resist the solvent action of baths, and, still further, the liability of derangement of the sensitized film with relation to its backing, which is more or less incident to all flexible dry-plates heretofore known to me, and even with glass plates, because of the imperfect union of the emulsion film with its supporting-plate.

My flexible photographic dry-plate embodies a plate or strip of transparent celluloid and a sensitized film formed of an emulsion, which, with one form of my improved plate, may be compounded, prepared, and applied like any of the most desirable emulsions heretofore known; but in its best form my plate carries a coating initially containing a suitable quantity of any of the well-known solvents of celluloid, whereby a more perfect union of the emulsion film with the supporting-plate is secured than is possible with any variety of plate heretofore known to me, whether flexible or inflexible, thus obviating "frilling" or "curling," or any derangement of the coating, by whatever name it may be known. In providing for this desirable union with the celluloid plate good results will accrue if, instead of the alcohol usually employed with gelatin emulsions to cause them to flow evenly, a solvent of celluloid be used. In many cases it is, however, desirable to employ a solvent of celluloid, with a plain gelatin solution, and, after applying this as a coating to the celluloid plate, to then apply to the foundation thus afforded the emulsion, which will thus be incorporated with its backing.

Of the several well-known solvents of celluloid I prefer to employ acetic ether, and as it is to be used in lieu of alcohol no specific proportions need be considered, it being well known that alcohol is used in every case according to the easy flowing capacity desired in each mixture.

It will be readily seen that it is quite immaterial in what manner the solvent of celluloid be employed, so long as it causes a practical merging of some portion of the coating with the celluloid plate.

In using the term "celluloid" it will of course be understood that I include thereby such camphorated preparations of pyroxilin as are known to be capable of being formed into thin transparent sheets, regardless of any particular name by which they have been or may be designated.

When the celluloid plate is of proper thickness, it is susceptible, when coated for use, of being put up on rollers in considerable length and used after the manner of paper, and when of the same thickness and freed from bending tendencies it may be used in the form of plates, although I prefer that when so used there shall be at least sufficient thickness to enable the plates to be used after the manner of glass plates and in connection with such holders as are usually employed for glass.

My plates have special value as "transparencies," and when carefully colored afford unusually brilliant effects. When my plates are used after the manner of glass plates, they will be found to fill every requirement, being much lighter and occupying much less space, and the non-liability of breakage with specially-valued views renders the somewhat-greater cost of no practical consequence.

The durable character of my plates is such as to warrant me in calling them practically indestructible, meaning thereby that under all the circumstances strictly incident to their use they can and do successfully resist breakage and injury, although the highly-combustible nature of celluloid will of course render it precarious to expose my plates to flame, although they can be safely exposed to any temperature properly incident to photography.

Having thus described my invention, I claim as new and desire to secure by Letters Patent—

1. A flexible photographic dry plate, consisting of a thin transparent sheet of celluloid, and a sensitized gelatinous film initially containing a solvent of celluloid, substantially as described.

2. The combination substantially as hereinbefore described, of a thin transparent sheet of celluloid, and a thin coating of gelatin initially containing a solvent of celluloid, and serving as a foundation for the reception of a sensitized emulsion for photographic purposes.

RUSSELL S. PENNIMAN.

Witnesses:
CHARLES H. MUNSON,
JAMES H. NEIGHBOUR.